United States Patent [19]

Hoefer

[11] 4,205,864
[45] Jun. 3, 1980

[54] CONTROLLED DEMAND PRIORITY HYDRAULIC CIRCUIT

[75] Inventor: Wayne A. Hoefer, Joliet, Ill.
[73] Assignee: Caterpillar Tractor Co., Peoria, Ill.
[21] Appl. No.: 950,879
[22] Filed: Oct. 12, 1978
[51] Int. Cl.² .............................................. B60G 11/28
[52] U.S. Cl. ...................................... 280/714; 91/390; 91/445
[58] Field of Search ........................ 280/714, 708, 6 H; 91/390, 446, 448, 532, 516, 461, 445; 60/422; 137/101

[56] References Cited

U.S. PATENT DOCUMENTS

| | | | |
|---|---|---|---|
| 3,386,344 | 6/1968 | Junck | 91/532 |
| 3,550,505 | 5/1969 | Byers, Jr. | 91/516 |
| 3,642,019 | 2/1972 | Kramer | 137/101 |
| 3,865,135 | 2/1975 | McWilliams | 91/461 |
| 3,953,040 | 4/1976 | Unruh | 280/6 H |
| 4,006,667 | 2/1977 | Bianchelta | 91/445 |
| 4,074,528 | 2/1978 | Lourigan | 60/422 |
| 4,076,275 | 2/1978 | Hiruma | 280/714 |

*Primary Examiner*—Robert R. Song
*Attorney, Agent, or Firm*—William B. Heming

[57] ABSTRACT

In a hydraulic circuit (10) fluid is passable from a priority valve (28) through control and lockout valves (30,32) to, for example, a suspension system (27) of a work vehicle (20) or control cylinders of a steering assembly. The lockout valve (32) provides for controllably operating or locking out, for example, the operation of the suspension system (27) where desired. The control valve (30) controllably passes fluid to the suspension system (27), for example, based upon demand created by operation of the system (27). The control valve (30) also delivers a signal to the priority valve (28) for maintaining priority of fluid flow from the priority valve (28) to the suspension system (27). In the circuit (10), the signal is automatically, controllably blocked in response to locking out the operation of the suspension system (27) for preventing the priority valve (28) from maintaining priority fluid flow to the non-operative suspension system (27).

7 Claims, 1 Drawing Figure

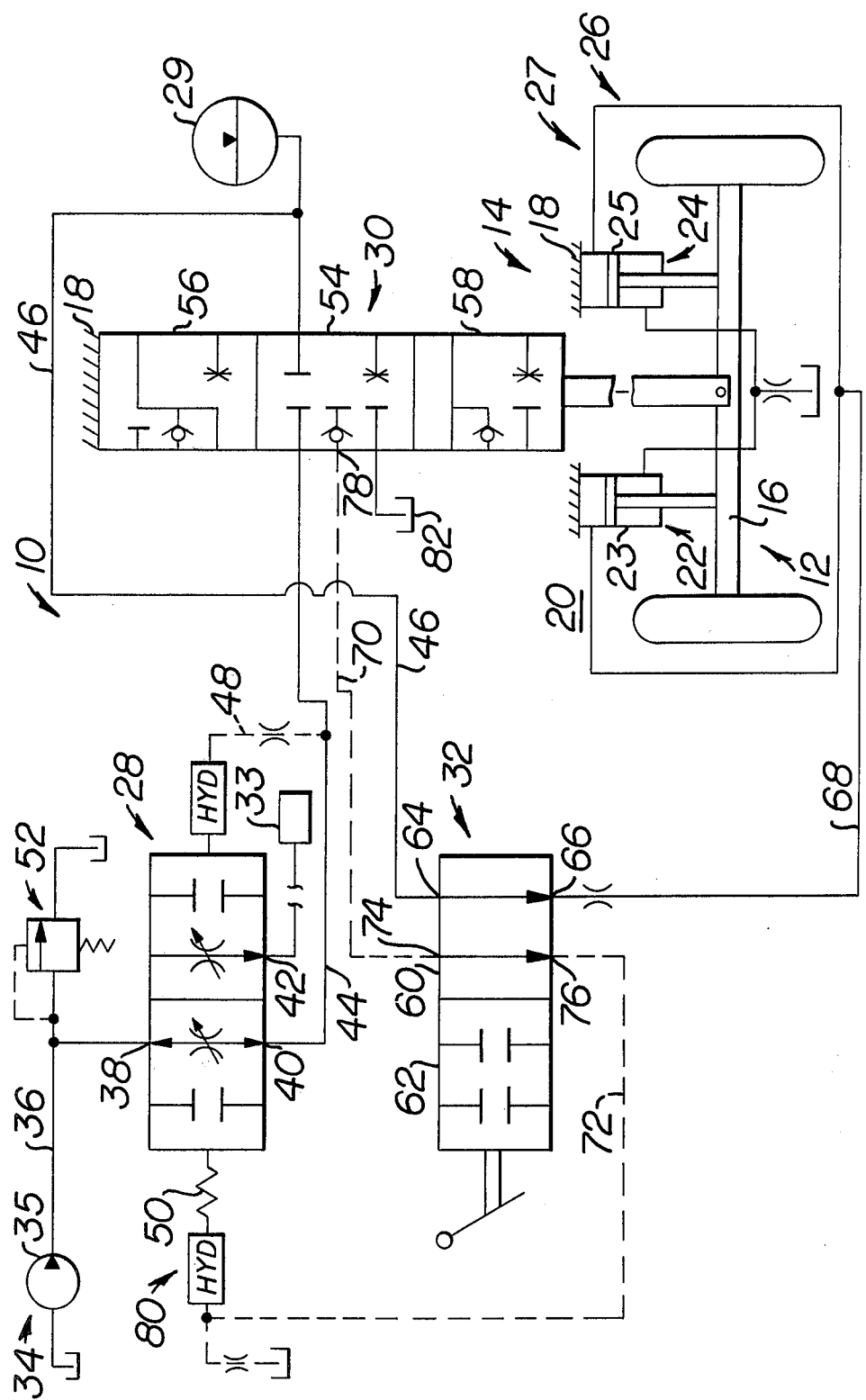

CONTROLLED DEMAND PRIORITY HYDRAULIC CIRCUIT

TECHNICAL FIELD

The invention relates to a hydraulic circuit having a priority valve, a lockout valve through which fluid is passable from the priority valve, and a control valve for controllably passing the fluid from the priority valve to the lockout valve and delivering a signal to the priority valve in response to said control valve passing the fluid to the lockout valve. More particularly, the invention relates to controllably, automatically blocking said signal from passing to the priority valve.

BACKGROUND ART

In the use of a priority hydraulic circuit having a lockout valve and a control valve, it is desirable to prevent priority fluid flow from a priority valve to an associated work system in response to demand of the control valve where said demand is created as a result of a primary work system being locked out of or blocked from operation by the lockout valve. In this manner, the priority valve creates priority fluid flow to a secondary work system and prevents a pressurized fluid source from pumping against relief pressure of the circuit owing to the locked out condition of the primary work system.

U.S. Pat. No. 3,642,019 which issued to Kramer on Feb. 15, 1972, shows an embodiment of a hydraulic circuit having a priority valve controllably passing fluid from primary and secondary outlets. A control valve causes the priority valve to direct all fluid through the secondary outlet in response to pressure in the primary outlet reaching a preselected magnitude.

U.S. Pat. No. 4,074,528 which issued to Lourigan on Feb. 21, 1978, discloses a pilot operated priority valve which passes fluid from a primary outlet to a steering control valve. The steering control valve passes a fluid signal to the priority valve in order to provide flow to said steering control valve in response to the demand of said valve.

U.S. Pat. No. 3,386,344 which issued to Junck on June 4, 1968, shows another embodiment of a priority valve which passes fluid to a steering control valve. Priority to the control valve is assured by fluidly communicating the line passing fluid from the priority valve to the control valve with one side of a valve spool of the priority valve.

U.S. Pat. No. 3,550,505 which issued to Byers, Jr. on Dec. 29, 1970, shows yet another embodiment of a priority valve passing fluid to a control valve. A fluid line from the control valve to a spring chamber of the priority valve assures priority of fluid flow to the control valve in response to demands of the control valve.

U.S. Pat. No. 3,953,040 which issued to Unruh on Apr. 27, 1976, shows a leveling control valve connecting the axle and frame of a work vehicle for automatically maintaining the axle at a preselected position relative to frame by automatically passing fluid to suspension cylinders in response to relative movement of the axle and frame.

U.S. Pat. No. 3,865,135 which issued to McWilliams on Feb. 11, 1975, shows the use of manually operated lockout valve which is used to block fluid flow to suspension cylinders of a work vehicle in order to lock out the operation of the vehicle suspension.

For example, a cushioning or suspension system is generally provided on a tractor portion of a scraper in order to improve the controllability and ride of the scraper. The suspension system is commonly based upon hydraulic cylinders connected to the frame and axle of the scraper for controlling relative movement of said frame and axle. A priority valve is used to establish the priority of fluid flow from a fluid source to the system relative to other work systems of the scraper. A control valve is used to automatically, controllably respond to the demands of the suspension system and provide the necessary fluid flow to or from said system. The control valve also delivers a signal to the priority valve in order to assure the priority of fluid flow to the suspension system.

In such suspension systems, a lockout valve is preferably added to the hydraulic circuit to provide for selective operation of the suspension system. For example, it is desirable that the suspension system be locked out of or blocked from operation during loading cycles of the scraper. This results in better control and handling during the loading operation. However, in locking out the suspension system, said system can be maintained at a position at which the control valve continues to signal the priority valve to maintain priority fluid flow to the inoperative suspension elements. This can result in the pressurized fluid source pumping fluid against the relief pressure of the hydraulic circuit creating energy loss, heating of the oil, and lack of fluid flow from the priority valve to secondary work systems.

Therefore, it is desirable to automatically controllably block the signal from being delivered by the control valve to the priority valve in response to the suspension system being locked out of operation for establishing priority to secondary systems and preventing fluid flow to the inoperative suspension system.

DISCLOSURE OF INVENTION

In one aspect of the present invention, a hydraulic circuit has a priority valve, a control valve and a lockout valve. The priority valve has a primary outlet positionable in fluid communication with the lockout valve. The lockout valve is movable between first and second positions at which fluid is passable through said valve and blocked from passing through said valve, respectively. The control valve is associated with the priority and lockout valves and is of a construction sufficient for controllably passing fluid from said primary outlet to the lockout valve and delivering a signal to the priority valve. The signal is sufficient for controllably moving the priority valve into fluid communication with the lockout valve. Said signal is controllably, automatically blocked from being delivered to said priority valve in response to said lockout valve being at the second position.

The hydraulic circuit is used to control, for example, a self-leveling hydraulic syspension system of a work vehicle. The lockout valve provides for operating or locking out the operation of the suspension system where desired. The control valve controls the passing of fluid to the suspension system and delivers the signal to assure fluid priority to said suspension system based upon demand. The signal is controllably, automatically blocked in response to the lockout valve being used to lock out the operation of the suspension system in order to prevent priority fluid flow to the locked out system and to establish priority of fluid flow to a secondary work system.

BRIEF DESCRIPTION OF DRAWING

The drawing is a diagrammatic view of an embodiment of the invention associated with a suspension system of a work vehicle.

BEST MODE FOR CARRYING OUT THE INVENTION

Referring to the drawing, a hydraulic circuit 10 is associated with first and second members 12,14 each movable one relative to the other. Said members 12,14 are, for example, an axle 16 and frame 18, respectively, of a work vehicle 20. First and second work elements 22,24 are connected to the axle 16 and frame 18. Said work elements 22,24 are of a construction sufficient for controllably maintaining the axle 16 and frame 18 in a first preselected position 26 one relative to the other. Said work elements 22,24, shown as hydraulic cylinders 23,25, act in cooperation with the hydraulic circuit 10 to operate as a leveling suspension system 27. An accumulator 29 provides spring action for said suspension system 27. Said hydraulic circuit 10 and said suspension system 27 are hereinafter more fully described.

The hydraulic circuit 10 has a priority valve 28, a control valve 30 and a lockout valve 32. A pressurized fluid source 34, shown as a hydraulic pump 35, supplies fluid through a supply line 36 to a fluid inlet 38 of the priority valve 28. The priority valve 28 is positionable with a primary fluid outlet 40 in fluid communction through the control valve 30 with the lockout valve 32 and at a secondary fluid outlet 42 with a secondary work system 33. The priority valve 28 shown is infinitely positionable in fluid communication with the lockout valve 32 through first and second lines 44,46. Priority of fluid flow from the inlet 38 to the primary outlet 40 is established by a spring 50 acting against fluid pressure in a plot line 48, as is known in the art. A relief valve 52 is provided to protect the circuit 10.

The control valve 30 is associated with the priority and lockout valves 28,32. Said valve 30 is of a construction sufficient for controllably passing fluid from the primary outlet 40 of the priority valve 28 to the lockout valve 32 and for delivering a signal to the priority valve 28 in response to said control valve 30 passing fluid from said primary outlet 40 to the lockout valve 32. The control valve 30 is connected to the first and second lines 44,46 and is movable between first, second and third positions 54,56,58 for controllably positioning said lines 44,46 in fluid communication one with the other for passing fluid from the priority valve 28 to the lockout valve 32.

The control valve 30 is connected to the axle 16 and frame 18 and controllably, automatically passes fluid from the priority valve 28 to the lockout valve 32 in response to the axle 16 and frame 18 being at a second preselected position (not shown) one relative to the other. Said second position represents travel of the axle 16 to a location more closely spaced from the vehicle frame 18 than at the first preselected position 26. The lockout valve 32 is movable between a first position 60 at which fluid is passable through said valve 32 and a second position 62 at which fluid is blocked from passing through said valve 32. Said lockout valve 32 has a work fluid inlet and outlet 64,66 connected to the second line 46 and a third line 68, respectively, through which flow of fluid through the valve 32 from the control valve 30 is controlled.

Fluid passing from the priority valve 28 to the lockout valve 32 is thus directable through said lockout valve 32 at the first position 60 and through the third line 68 to the hydraulic cylinders 23,25 for automatic leveling of the frame 18 relative to the axle 16. At the second position 62, said lockout valve 32 locks out or prevents the automatic leveling operation. A suspension system and associated control valve is disclosed, for example, in U.S. Pat. No. 3,953,040 which issued on Apr. 27, 1976, to Unruh.

The signal delivered by the control valve 30 to the priority valve 28 is sufficient for controllably moving the priority valve 28 into fluid communication with the lockout valve 32. Said signal is controllably, automatically blocked from said priority valve 28 in response to said lockout valve 32 being at the second position 62. In this manner, priority fluid flow from the primary outlet 40 of the priority valve 28 is assured to the hydraulic cylinders 23,25 by being based upon the demand for fluid established by the control valve 30. However, moving the lockout valve 32 to the second position 62 automatically, controllably interrupts the signal and prevents a demand for fluid by the control valve 30 when the suspension system 27 is inoperative.

In the preferred embodiment, said signal is a fluid signal and the lockout valve 32 is of a construction sufficient for blocking said fluid signal from the priority valve 28. Said signal passes to the priority valve 28 through first and second signal lines 70,72 from the control valve 30. The lockout valve 32 has a signal inlet and outlet 74,76. The first signal line 70 is connected to a signal outlet 78 of the control valve 30 and to the signal inlet 74 of the lockout valve 32. The second signal line 72 is connected to the signal outlet 76 of the lockout valve 32 and a spring chamber 80 of the priority valve 28. At the first position 60 of the lockout valve 32, said valve 32 controllably communicates both the signal inlet 74 to the signal outlet 76 and the work fluid inlet 64 to the work fluid outlet 66. At the second position 62, the lockout valve 32 blocks communication of said related inlets and outlets for controlling the signal delivered by the control valve 30 simultaneously with the lockout function of the lockout valve 32.

It should be understood that the hydraulic circuit 10 and associated elements can be of other configurations as is known in the art without departing from the invention.

Industrial Applicability

In the use of the hydraulic circuit 10, the priority valve 28 passes fluid from the primary outlet 40 through the control valve 30 and to the lockout valve 32 to controllably operate the suspension system 27. The work vehicle 20 with which said hydraulic circuit 10 and the suspension system 27 are associated is, for example, a scraper 20. The suspension system 27 is positioned on the tractor portion of said scraper 20 to provide controllability and comfort for an operator of the scraper 20. During travel and unloading cycles of the scraper 20, the lockout valve 32 is positioned at the first or open position 60 to provide fluid flow from the priority valve 28 to the hydraulic cylinders 23,25 for operation of the suspension system 27. During loading cycles, the operator of the scraper 20 moves the lockout valve 32 to the second position 62 to prevent operation of the suspension system 27 for better control and stability of the scraper 20 during loading.

As the scraper 20 travels, the control valve 30 automatically, controllably moves between the first, second and third positions 54, 56, 58 in response to movement of the axle 16 and frame 18 relative one to the other and owing to the interconnection of said valve 30 with the axle 16 and frame 18. The control valve 30 is at the first position 54 in response to the axle 16 and frame 18 being at the desired relationship of the first preselected position 26 (shown). At said first position 54 of the control valve 30, fluid is blocked from passing from the priority valve 28 to the lockout valve 32 and no fluid signal is delivered from the control valve 30 to the priority valve 28.

The control valve 30 is moved toward the second position 56 in response to the frame 18 being spaced further than desirable from the axle 16 owing to travel of the suspension system 27. At the second position 56 of the control valve 30, fluid is blocked from passing to the lockout valve 32 and no fluid signal is delivered to the priority valve 28. The second line 46 extending between the control valve 30 and lockout valve 32 is, however, opened to a tank 82 of the hydraulic circuit 10. At the above mentioned relationship of the frame 18 and axle 16, the frame 18 tends to return relative to the axle 16 to the first preselected position 26 owing to the force of gravity on said frame 18. The result is to force an amount of fluid from the hydraulic cylinders 23,25 into the tank 82 which is dependent upon the degree of return travel of the frame 18.

The control valve 30 moves toward the third position 58 in response to the frame 18 being spaced closer than desirable to the axle 16. Said relationship represents the second preselected position of the axle 16 and frame 18 one relative to the other. At said third position 58, the priority valve 28 is in fluid communication with the lockout valve 32 and a fluid signal is delivered to the lockout valve 32. If the lockout valve 32 is in the first or open position 60, fluid passes from the priority valve 28 and into the hydraulic cylinders 23,25 to expand said cylinders 23,25. This tends to space the frame 18 further from the axle 16. The fluid signal passes through the lockout valve 32 to the priority valve for assuring priority of fluid flow to the cylinders 23,25 for operation of the suspension system 27.

When the lockout valve 32 is moved to the second position 62, said suspension system 27 is locked at the condition said system 27 is in at the moment of said valve 32 reaching the second position 62. In other words, the frame 18 and axle 16 are maintained at their current relative positions by moving the lockout valve 32 to the second position 62. If said relative positions establish the second preselected position, at which the control valve 30 is moved toward the third position 58, the control valve 30 creates a "false" demand on the primary outlet 40 of the priority valve 28 by continuing to deliver the fluid signal to the priority valve 28.

In the hydraulic circuit 10 of the present invention, however, the fluid signal is blocked from being delivered to the priority valve 28 in response to moving the lockout valve 32 to the second position 62. The priority valve 28 is thus made responsive to the true demand conditions of the hydraulic circuit 10 and establishes priority of fluid flow from the secondary outlet 42 to the secondary work system 33. In the above-mentioned manner, the hydraulic pump 35 is prevented from operating against the relief pressure of the primary or suspension system circuit for substantially overcoming associated problems such as energy loss and for establishing fluid flow to a secondary work system.

Other aspects, objects and advantages of this invention can be obtained from a study of the drawings, the disclosure and the appended claims.

What is claimed is:

1. In a hydraulic circuit (10) having a priority valve (28), a control valve (30) and a lockout valve (32), said priority valve (28) having primary and secondary outlets (40,42) and being positionable with the primary outlet (40) in fluid communication with the lockout valve (32), said lockout valve (32) being movable between a first position (60) at which fluid is passable through said lockout valve (32) and a second position (62) at which fluid is blocked from passing through said lockout valve (32), said control valve (30) being associated with the priority and lockout valves (28,32) and being of a construction sufficient for controllably passing fluid from said primary outlet (40) to the lockout valve (32) and for delivering a signal to the priority valve (28) in response to said control valve (30) passing fluid from said primary outlet (40) to the lockout valve (32), said signal being sufficient for controllably moving the priority valve (28) into fluid communication with the lockout valve (32), the improvement comprising:

said signal being automatically, controllably blocked from said priority valve (28) in response to said lockout valve (32) being at the second position (62).

2. The hydraulic circuit (10), as set forth in claim 1, wherein the signal is a fluid signal and said lockout valve (32) is of a construction sufficient for blocking said fluid signal from the priority valve (28).

3. The hydraulic circuit (10), as set forth in claim 2, wherein the lockout valve (32) has a signal inlet (74) and outlet (76) and a work fluid inlet (64) and outlet (66) and controllably communicates said related inlets and outlets (74,76; 64,66) at the first position (60) of said lockout valve (32) and blocks communication of said related inlets and outlets (74,76; 64,66) at the second position (62) of said lockout valve (32).

4. The hydraulic circuit (10), as set forth in claim 1, including first and second members (12,14) each movable one relative to the other and wherein said control valve (30) is connected to said first and second members (12,14) and controllably, automatically passes fluid from the priority valve (28) to the lockout valve (32) in response to said members (12,14) being at a preselected position (59) one relative to the other.

5. The hydraulic circuit (10), as set forth in claim 4, wherein the first and second members (12,14) are the axle (16) and frame (18) of a work vehicle (20), respectively.

6. A hydraulic circuit (10), comprising:

a lockout valve (32) movable between a first position (60) at which fluid is passable through said lockout valve (32) and a second position (62) at which fluid is blocked from passing through said lockout valve (32);

a priority valve (28) having an inlet (38) and primary and secondary outlets (40,42) and being positionable with the primary outlet (40) in fluid communication with the lockout valve (32);

a control valve (30) associated with said priority and lockout valves (28,32) and being of a construction sufficient for controllably, automatically passing fluid from said primary outlet (40) to the lockout valve (32) and for passing a fluid signal to the priority valve (28) in response to said control valve (30)

passing fluid from said primary outlet (40) to the lockout valve (32), said signal being sufficient for controllably moving the priority valve (28) into fluid communication with the lockout valve (32); and said lockout valve (32) being of a construction sufficient for controllably, automatically blocking said fluid signal from passing to the priority valve (38) in response to said lockout valve (32) being at the second position (62).

7. A vehicle (20), comprising:

first and second members (12,14) each being movable one relative to the other;

a work element (22) connected to said first and second members (12,14) and being of a construction sufficient for controllably maintaining said first and second members (12,14) in a preselected position (26) one relative to the other;

a pressurized fluid source (34);

a lockout valve (32) associated with the work element (22) and fluid source (34) and being movable between a first position (60) at which fluid passes from said fluid source (34), through said lockout valve (32) and to the work element (22) and a second position (62) at which fluid is blocked from passing through said lockout element (32);

a priority valve (28) having an inlet (38) and primary and secondary outlets (40,42) and being positionable with the inlet (38) in fluid communication with the fluid source (34), and with the primary outlet (40) in fluid communication with said lockout valve (32); and a control valve (30) connected to the first and second members (12,14), associated with said priority and lockout valves (28,32) and being of a construction sufficient for controllably, automatically passing fluid from said primary outlet (40) to the lockout valve (32) in response to said members (12,14) being at a preselected position (59) one relative to the other and for passing a signal to the priority valve (28) in response to said control valve (30) passing fluid from the primary outlet (40) to the lockout valve (32), said signal being sufficient for controllably moving the priority valve (28) into fluid communication with the lockout valve (32) and being controllably, automatically blocked from said priority valve (28) in response to said lockout valve (32) being at the second position (62).

* * * * *